United States Patent [19]

Guenther et al.

[11] 4,421,587

[45] Dec. 20, 1983

[54] LABEL FEEDER FOR FAN FOLDED DOCUMENTS

[75] Inventors: Kenneth L. Guenther, Park Ridge; Edward H. Zemke, Chicago, both of Ill.; Gerald D. Warden, Easton, Pa.

[73] Assignee: Bell & Howell Company, Chicago, Ill.

[21] Appl. No.: 399,605

[22] Filed: Jul. 19, 1982

[51] Int. Cl.[3] .......................... B32B 31/18; B32B 35/00

[52] U.S. Cl. .................................... 156/256; 156/267; 156/521; 156/556

[58] Field of Search ............... 156/252, 256, 267, 269, 156/521, 528, 529, 556, 568

[56] References Cited

U.S. PATENT DOCUMENTS

| | | | |
|---|---|---|---|
| 3,565,724 | 2/1971 | Yamaguchi | 156/521 |
| 3,783,058 | 1/1974 | Solomon et al. | 156/521 |
| 4,124,435 | 11/1978 | Stump et al. | 156/521 |

*Primary Examiner*—Caleb Weston

*Attorney, Agent, or Firm*—Neal C. Johnson; Alan H. Haggard; Alan B. Samlan

[57] ABSTRACT

A device for feeding address labels on a web with the address labels arranged in a column, each address label equal in size to adjacent address labels. There are non-addressed areas at equally spaced distances along the web, with the non-addressed areas separated by the address labels. There are two cutters placed after the web feeder. The first cutter operates after each increment of the web. The second cutter operates only after an increment of the web wherein the web is fed the distance of an address label plus the height of a non-addressed area. The non-addressed area is cut from the address label and removed, and the cut address label is affixed to the mail piece. The device provides for incrementing the web either a distance equal to an address label or a distance equal to an address label plus the height of a non-addressed area. The web feeding and cutting is synchronized with the application of the labels to the mail pieces, with the movement of the mail pieces through the web application area also synchronized with the web feeding and cutting.

29 Claims, 10 Drawing Figures

LABEL FEEDER FOR FAN FOLDED DOCUMENTS

BACKGROUND AND SUMMARY OF THE INVENTION

This invention relates to a device for preparing and feeding address labels from a web in which the address labels were generated from a computer and high speed printer.

In the preparation of labels for the mass mailing of magazines, envelopes, newspapers or the like, address labels generated from computers are printed by high speed laser printers in columns and rows on sheets of a web or continuous form paper, usually having perforations at pre-determined spaces along the web and having transport holes either along the sides or center of the web. Depending upon the input to the computer, and the demands of the user, the names and addresses are printed in varying numbers of columns; this can be a single column, or two, three, four or more columns to a given width of webbed material. In addition, the height of each name and address combination may vary depending upon the number of lines in each address. Improvements in labelling devices have been provided to vary the feed mechanism for a sheet of web material so that varying lengths and heights of labels can be cut from the web. One such improvement is illustrated in U.S. Pat. No. 4,124,435 entitled "Label Cutting Head," inventor Stump et al and assigned to the Assignee of the present invention. The '435 patent alleviated the major gear changes necessary in order to change the label cutting head so that varying sizes of labels could easily be cut from the web.

The devices as illustrated in the prior art used pin feeder means to drive the computer produced list of names and addresses through a guillotine cutting blade to cut a single row containing a multiple number of names and addresses to a given height. The strip of paper cut by the guillotine is fed laterally to a rotary blade which cuts the strip into separate labels depending upon the number of columns appearing on the web. Then each label is carried to a glue-applying head and application station where the label is applied to the mailing piece.

Machines of the above-described type are currently available and are constructed to cut the continuous web into individual strips, and the strips into individual labels of varying heights and lengths. The improvements in the prior art permitted a rapid changeover to vary the height and width of the labels cut from the web. However, a new and major problem has arisen with respect to high speed computer printers which produce continuous webs of address labels.

Particularly, the new high speed laser printers do not print over the entire height of an individual page in the web. For example, if an individual sheet of the web which is attached to adjacent sheets by perforations is eleven inches high, the laser printer can only print from approximately one-half inch below the top of the perforation to approximately one-half inch above the bottom perforation of the sheet. This means that on an eleven inch high paper, the printer can only print on approximately ten inches of the overall height of the paper. On the sheet immediately following the previously printed sheet, the same restrictions apply and the first one-half inch of paper is not printed upon. As the sheets are attached at their perforated ends, this results in a total of one inch of non-printed area between adjoining sheets.

In most instances this does not present a problem as the sheets are torn apart or burst and then collated or sent out as individual sheets. However, in the preparation of labels from a laser printer, this does create a new and heretofore unsolved problem.

The one inch gap between adjacent joined sheets results in a band of labels being generated having no address printed thereon. In the prior automated label application systems, there has been no practical way to remove this non-printed label prior to affixing it to a mail piece. Thus, each time there was a transition from one page of printed addresses to the next page, there were one or more blank (depending on the number of columns of labels on an individual sheet) labels applied to the mail pieces.

Due to these problems, laser printers have not been used to generate labels which are designed or adapted to be used on the automatic label application machines previously available.

There also has not been a device or method by which information can be placed on the web between address labels, and have this information removed by cutting it from the web and disposing of it. It might be advantageous to be able to put machine control information at pre-determined positions along the web and then remove it after it has served its purpose.

Therefore, it is a primary object of the present invention to provide a label preparing and feeding device which can prepare and apply labels to mailing pieces while removing non-addressed areas between adjacent sheets of the continuous web.

It is a related object to supply a label preparing and feeding device which can remove blank or non-addressed areas from the web regardless of whether the address labels are prepared in a single column or multiple columns.

Another object of the present invention is to provide a label preparing and feeding device which can remove the blank or non-addressed area from computer generated webs of address labels and not slow down or impede the through put of the machine.

A related object is to provide such a label feeding device which will remove the non-addressed areas while maintaining the synchronization of the label cutting and application with the movement of the mail pieces through the label application area.

Yet another object is to provide such a label feeding device which is economical in manufacture and reliable in operation.

Applicant's solution to this problem is to provide an improved label preparation and feeding device which compensates for and removes the non-addressed areas from webs of address labels generated as described above. Applicant's inventive device causes the web of addresses to be incrementally fed into a cutting device a distance equal to the height of a label when not adjacent to a non-addressed area. The label is cut and applied to the mailpiece in the conventional manner.

When a non-addressed area is adjacent a label, the invention causes the feeder to feed the web past the first cutter an amount equal to the label height plus the height of the non-addressed area. The first cutter is then activated to cut the combined height of web fed from the supply of web and a second cutter cuts the non-addressed area from the address label. The non-addressed area is removed and the address label is applied to the mail piece.

The web is printed in such a format that the non-addressed areas occur at regular, equally spaced distances along the web. The feeder mechanism provides for feeding the additional amount of web corresponding to the non-addressed area at the proper time in the web feeding cycle. This is accomplished by means of a segmented feeder wheel having a raised portion on its circumference. The raised portion engages a high speed wheel during a selected period of each cycle or revolution of the segmented feeder wheel. This corresponds to the time when the non-addressed area is fed into the cutter. The segmented feeder wheel drives the web feeder at a faster rate causing the non-addressed plus the adjacent address label to be fed past the first cutter in the same time period that normally only one address label is fed past the first cutter.

A ratchet wheel is mechanically connected to the feeder and/or first cutter and is incremented each time a label is cut. The ratchet wheel is connected to and rotates a cam wheel which controls the second cutter. Each revolution of the cam wheel corresponds to the feeding of a series of printed address labels between non-addressed areas. The next incremental advance of the ratchet wheel occurs when an addressed and non-addressed label is fed, with the non-addressed area incremented past the second cutter. The cam wheel activates the second cutter at this point in the cycle and the non-addressed area is cut from the addressed label.

There are also provided pawl and ratchet means on the feeder mechanism to maintain synchronization between the feeder mechanism whether it is feeding a single address label or an address label plus a non-addressed area and movement of the mail pieces through the label application area.

BRIEF DESCRIPTION OF THE DRAWINGS

These and other objects of the invention will become apparent from the following description of the preferred embodiment and description of the drawings wherein.

DESCRIPTION OF THE PREFERRED EMBODIMENT

Figure 1:
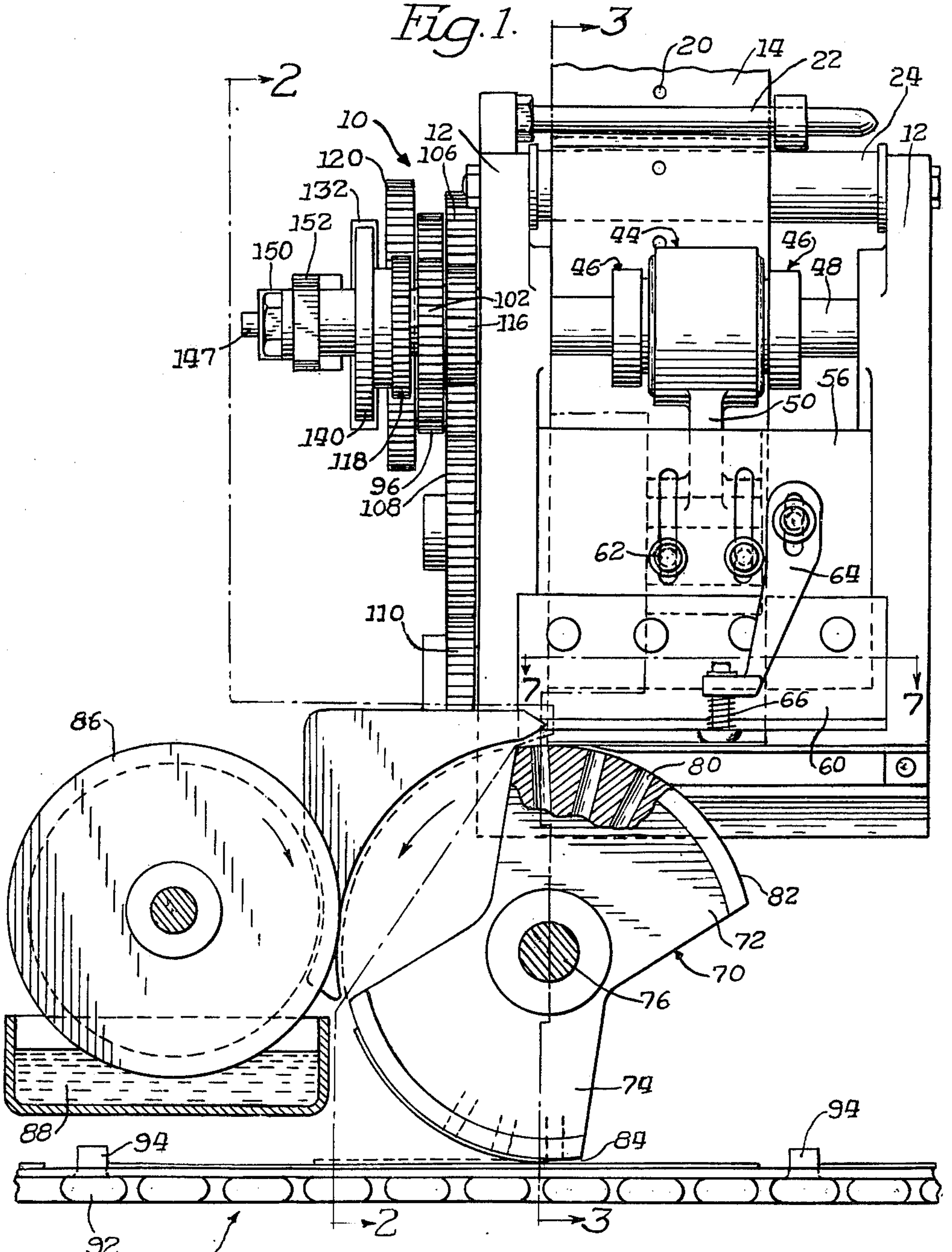
FIG. 1 is a side view taken perpendicular to the direction of movement of the mail pieces, with portions removed, of the inventive label preparing and feeding device.
Figure 7:
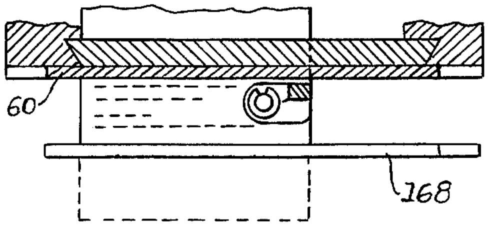
FIG. 7 is a top view with portions removed of the web cutting or guillotine mechanism.
Figure 8:
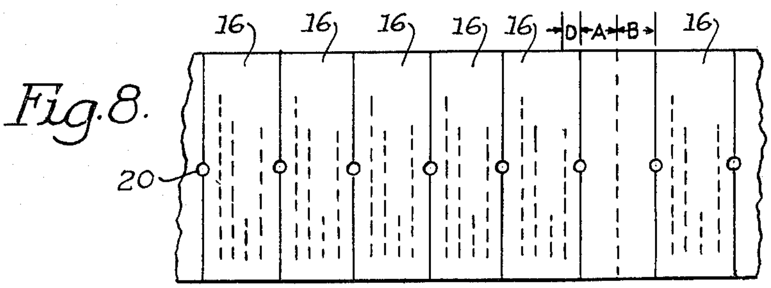
FIG. 8 is a top view of the web illustrating the orientation of the address labels and the non-printed areas.
Figure 3:
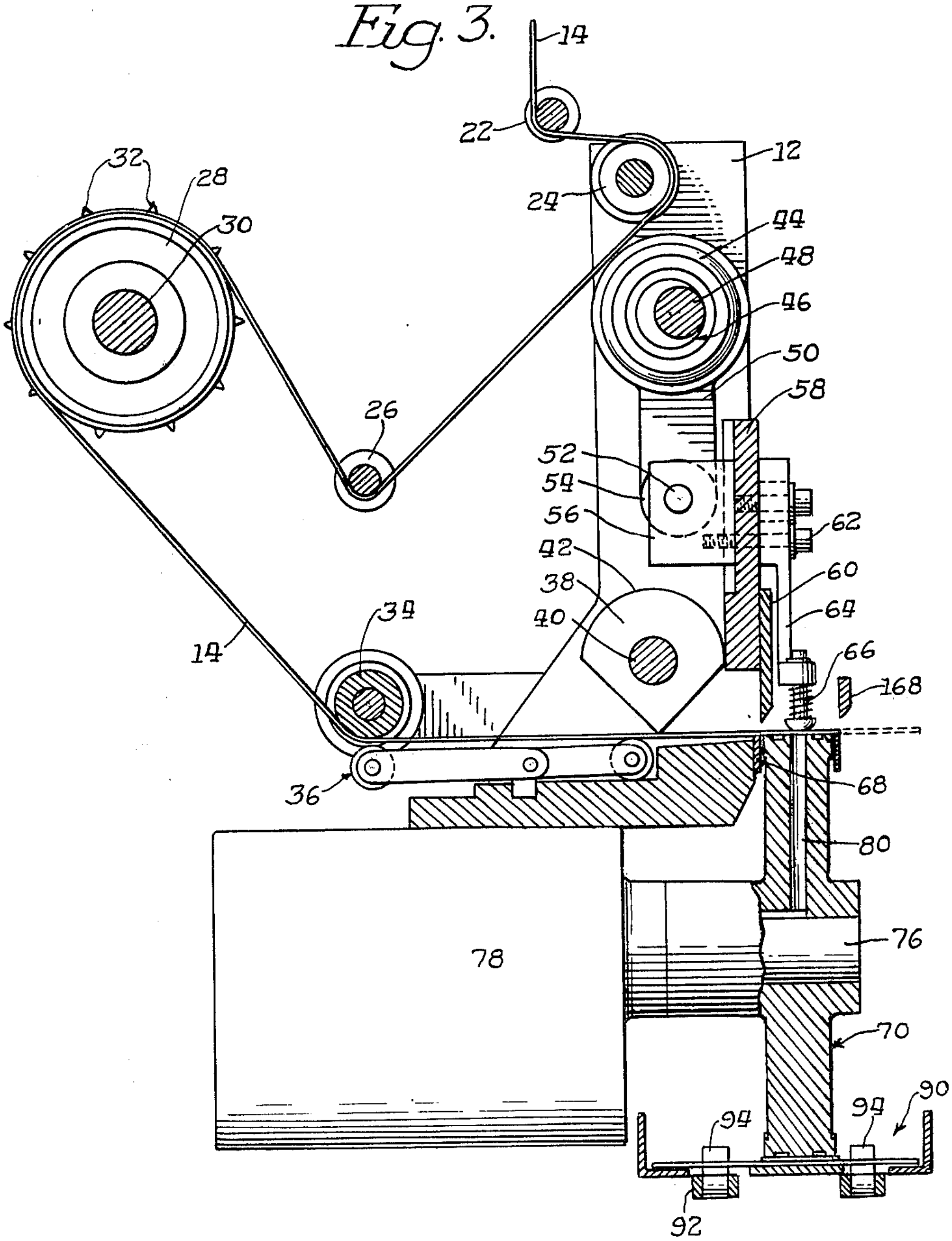
FIG. 3 is a cross-sectional view with portions removed taken along Line 3—3 of FIG. 1 and illustrates the movement of the web through the label preparation device.

Turning first to FIGS. 1 and 3, there is illustrated a label preparing and feeding device 10 including a frame or housing 12. A web of material 14 is preferably a computer produced web of paper having one or more columns of address labels having names and addresses printed thereon. In the illustrated embodiment, the web has only one column of names and addresses, each name and address representing one label. This can be more clearly seen in FIG. 8 wherein each address label 16 is equal in size to adjacent address labels. There is a perforation 18 which separates groups of address labels at predetermined distances. Generally, the perforations are placed at eleven inch centers so that eleven inch high documents can be created after bursting the web. Generally, the labels are pre-printed addresses generated from a computer having a laser printer such as an IBM 3800. However, this printing process produces non-addressed or non-printed areas A, B on either side of the perforation 18. These non-addressed areas are at equally spaced distances along the web and are separated by the address labels 16. There are pin or transport holes 20 spaced along the web and used to assist in feeding the web through the system by appropriate web drive means as will be more fully described below. Alternatively, the holes 20 can be placed along the outer sides of the web 14 which would allow for the pin feeding means engaging the web along its edges rather than in the center. Applicant's invention is not dependent upon the position or type of web feed holes, and will operate with either type.

The web 14 is supplied from a rack or roller (not illustrated) which stores a supply of the web having pre-printed labels thereon. The web passes over a series of idler and tensioning rollers 22, 24, 26 and is threaded over a sprocket wheel 28. The sprocket wheel 28 is affixed to a sprocket shaft 30 which results in the accurate metering of the proper amount of web 14 to be fed through the device 10. Pins 32 on the sprocket wheel 28 engage the holes 20 on the web which result in positive control of the web 14.

The web 14 then passes between an idler roller 34 and an endless belt and pulley arrangement 36 under a label feed roller 38 mounted on a label feed shaft 40. The label feed roller 38 is segmented so that a semi-cylindrical area 42 comes into contact with the web 14 with each revolution of the roller 38 and drives it forward into the cutting mechanism. Thus, for each revolution of the label feed roller 38 the semi-cylindrical area 42 should increment the length of web metered forward by the sprocket wheel 28. The sprocket wheel 28 will act as a brake and maintain tension on the web 14 so that only that amount of web metered forward by the sprocket wheel 28 will be fed forward by the label feed roller 38. The length of the semi-cylindrical area 42 must be sufficient to feed the amount of web metered forward. The amount of force which the label feed roller 38 applies to the web to drive it forward, should not be of such a nature as to cause the web 14 to tear. Thus, the label feed roller 38 must be able to slide or slip over the web 14 when the sprocket wheel 28 stops feeding the web 14, but must have sufficient force against the web to move it forward.

Mounted in the frame 12 is a collar assembly 44 mounted on eccentrics 46. These are rotated by a shaft 48 which is driven from an input power means (not illustrated). The rotation of the shaft 48 causes the eccentric 46 to move up and down driving a link arm 50 in a reciprocating up-down movement. The link arm 50 is connected through a shaft 52 and bearing 54 to a link 56. Mounted on link 56 is a ram 58 having affixed at its bottom end a first cutting knife 60. The height and depth of cut of the cutting knife 60 can be adjusted by means of adjusting screws 62.

Also attached to link 56 is a pressure link 64 which has attached at its bottom most end a pressure foot 66. The pressure foot 66 is spring loaded, to apply a constant pressure hold down force to the labels as they are fed past the knife 60. As the link arm 50 moves up and down, the pressure foot and knife 60 move with it.

The knife 60 cooperates with a fixed blade 68 to cut the web 14 each time a label is fed by means of the label feed roller 38 working in combination with the incrementing of the sprocket wheel 28. A segmented shoe 70 having oppositely positioned segments 72 and 74 is mounted on a shaft 76 having a hollow, central portion. The shaft 76 is in fluid communication with a vacuum plenum or chamber 78 within the housing of the device 10. Within the segmented shoe 70 are several ports 80 which communicate between the shaft 76 and the outer extremities of the segments 72, 74. The outer edges of the segments 72, 74 have track-like surfaces 82, 84 respectively. Thus, as the segmented shoe 70 rotates, and a vacuum is applied from the vacuum plenum 78 through the ports 80, a label which is cut from the web will be removed by means of the segments 72, 74 from the cutting area. The label is oriented so that the printed side with the address is held against the track-like surface 82 with the blank side exposed. The segmented shoe 70 rotates against a glue wheel 86 which has a portion submerged in a glue tank 80. This applies the glue or adhesive to the back side of the label so that it can subsequently be affixed to the mail piece.

As the segmented shoe rotates, the mail piece is moved along a raceway 90 which is composed of a chain 92 having pins 94 placed at equal distances along the chain 92. The chain 92 is synchronized in its movement along the raceway 90 so that an envelope or mail piece placed between the pins 94 will be moved under the segmented shoe 70 at an appropriate time so that the label will be placed on the mail piece at its proper position. The vacuum to the shoe 70 is controlled by a valve or other suitable means so that the vacuum is applied when the label is to be picked up, and the vacuum is released after the label contacts the mail piece. The above-described apparatus and operation has heretofore been known in the art as illustrated in U.S. Pat. No. 4,124,435, incorporated herein by reference. Furthermore, such devices have been manufactured by the Magnacraft Division of Bell & Howell Company under the Trademark "MAGNACRAFT" labelling head model 30 and 55.

As previously mentioned, the problem of how to compensate for non-addressed areas on a web having address labels thereon, was never approached. In fact, due to the problem of the non-addressed area on laser printed lists, this type of computer generated list was not used for address labels. Applicant's solution to removing the non-printed areas of the web permitted the use of such labels and will now be described.

Figure 2:
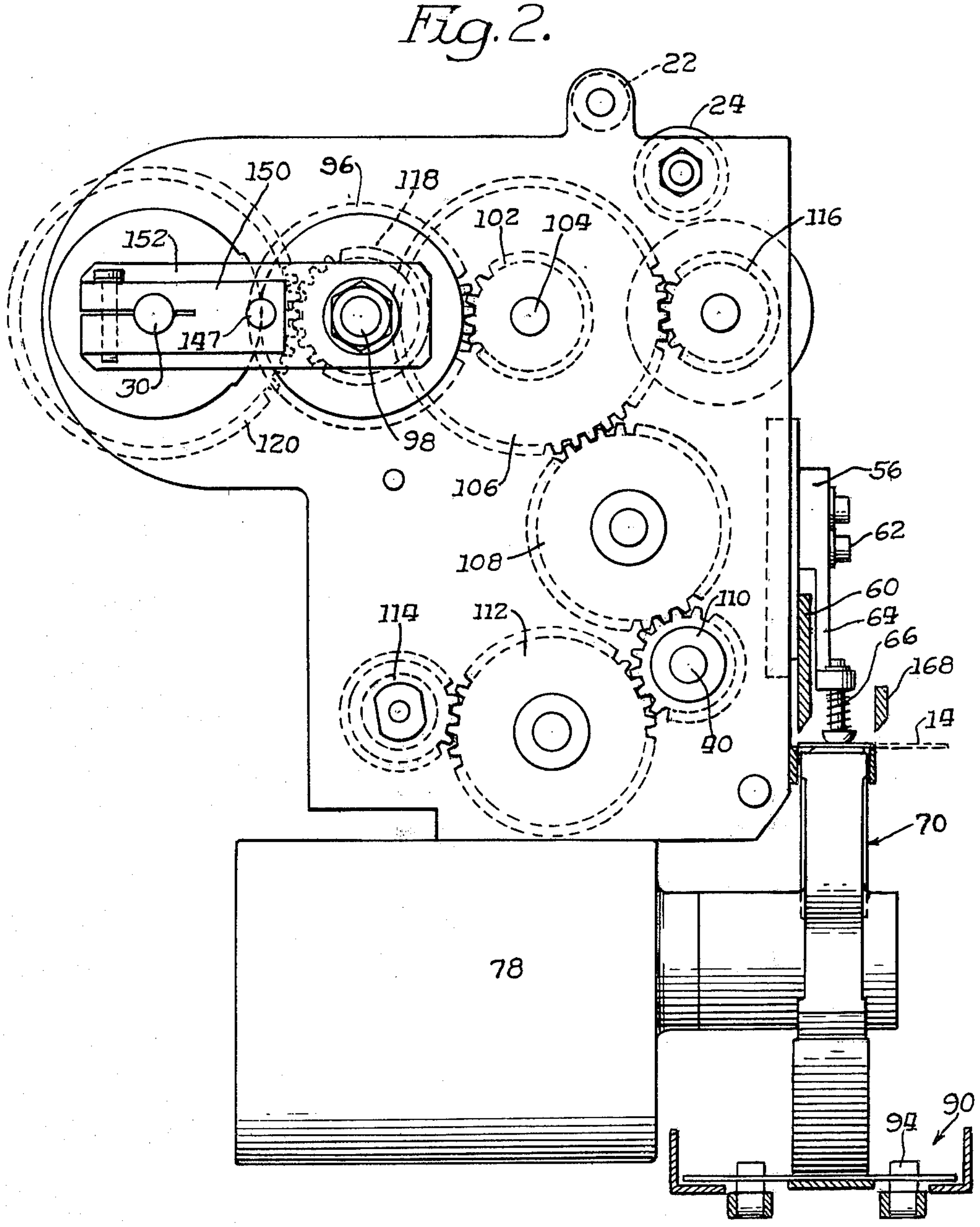
FIG. 2 is an end view taken along Line 2—2 of FIG. 1 and in the same direction as the movement of the mail pieces.
Figure 5:
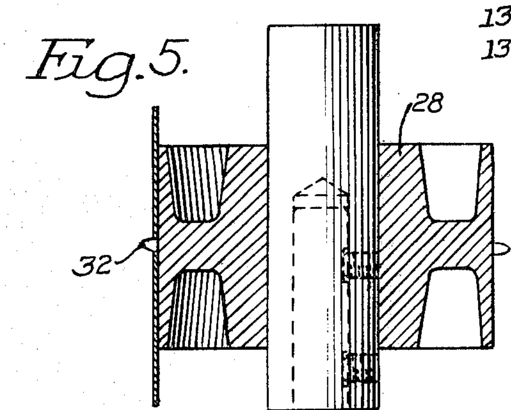
FIG. 5 is taken along Line 5—5 of FIG. 4, with portions removed, illustrating the gear drive mechanisms.
Figure 5:
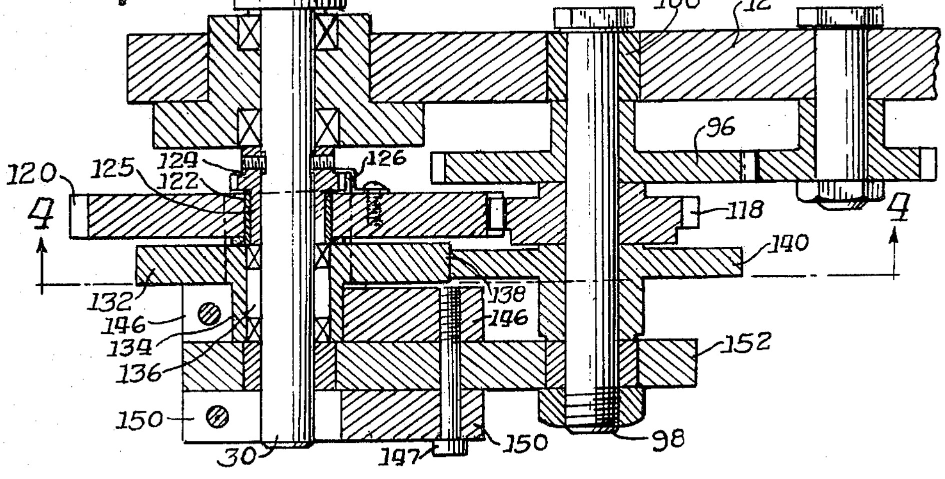

Turning to FIGS. 2 and 5, there is illustrated a power input gear 96 fixedly attached to shaft 98. The power input gear 96 is driven from a suitable power input means such as a motor and pinion arrangement (not illustrated). The power input gear 96 is supported within the frame 12 such that it rotates within a bearing 100. Thus, the shaft 98 rotates with the power input gear 96. In FIG. 2, it can be seen that the power input gear 96 drives gear 102 mounted on shaft 104. This in turn drives gear 106 which then drives transition gear 108 which meshes with and drives feed wheel gear 110 which is connected to and drives the same shaft 40 on which the label feed roller 38 is mounted. Gear 110 drives another transition gear 112 which drives feed roller gear 114 mounted on the same shaft on which the idler roller 34 is mounted. This arrangement can provide for the idler roller 34 to drive the web in the feed direction. Other gears within the mechanism, such as gear 116, are connected to drive the collar assembly 44, eccentric 46, and shaft 48 in such a manner as to provide power to drive the first cutting knife 60 up and down in synchronization with feeding of the web. Furthermore, the system is designed so that the envelopes or mail pieces move through or down the raceway 90 in synchronization with rotation of the segmented shoe 70 such that each envelope is properly positioned to receive only one label. Furthermore, the sprocket shaft 30 is synchronized to increment with each envelope as it passes through the label application area.

In order to provide the synchronization between the sprocket wheel 28 with the power input gear 96 as it drives shaft 98, shaft 98 has mounted for rotation a driving gear 118. Driving gear 118 meshes with and drives a driven gear 120 having an internal slot which will be more fully described below.

A ratchet 124 is mounted to shaft 30 and has a hub portion 125 positioned between the bearing 122 and shaft 30. Gear 120 has a bearing 122 which fits freely over the hub 125 which allows gear 120 to freely rotate around shaft 30. A pawl 126 is mounted on gear 120 by means of a pin 128. A spring 130 keeps the pawl 126 engaged with the ratchet 124. Thus, as the gear 118 drives gear 120, the pawl 126 advances the ratchet 124 which in turn advances the sprocket wheel 28. Gears 118 and 96 are driven by a suitable gear train and power input means so as to synchronize the movement of the mail pieces with the feeding of the pre-printed labels.

As previously mentioned, provisions must be made to feed the web an additional amount each time an address label is fed into the cutting means which is preceded by a non-addressed area. This second distance of feeding is equal to the height of a printed address label plus the height of the non-addressed area. The mechanism to accomplish this will now be described.

Figure 4:
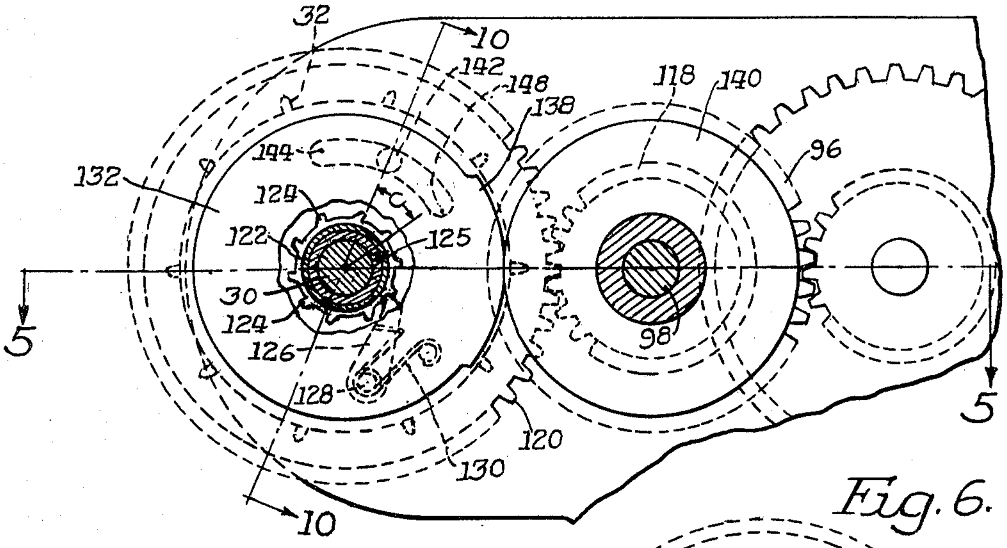
FIG. 4 is an end view with portions removed taken in the same direction as FIG. 2, and illustrates the mechanism used to drive the pin feeder.
Figure 6:
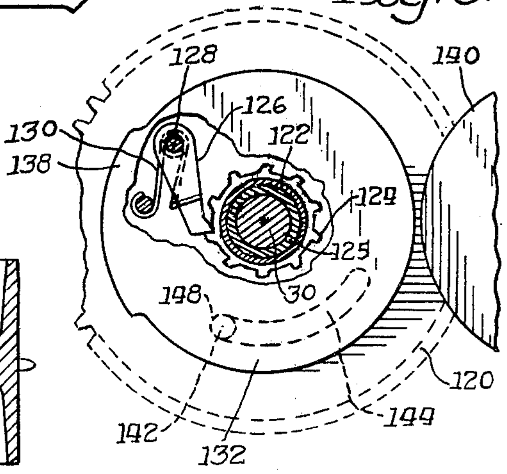
FIG. 6 is similar to FIG. 4, with portions removed, in a different period of the feeder cycle illustrating the movement of the gears.

Turning to FIGS. 4, 5 and 6 there is illustrated a segmented wheel 132 having a hub portion 134 extending around an over-running clutch 136 mounted on shaft 30. The over-running clutch is oriented so that the segmented wheel 132 will transmit torque to the sprocket shaft 30 in the sprocket wheel 28 feed direction (counter-clockwise in FIG. 4) when the segmented wheel 132 is engaged and driven. The segmented wheel 132 has a raised segmented or portion 138. Mounted on shaft 98 is a traction wheel 140 which rotates with the shaft 98. The traction drive wheel 140 intermittently engages the raised portion 138 of the segmented wheel 132 each time the segmented wheel 132 completes a revolution. When the traction drive wheel 140 engages the raised segment 138, it will drive the segmented wheel 132 in a counter-clockwise direction at a greater speed than the normal feeding speed transmitted to shaft 30 by means of gear 118 engaging gear 120. Thus, the sprocket shaft 30 will be driven through the over-running clutch 136 at an increased speed. The ratio between the traction drive wheel 140 and the raised segment 138 of segmented wheel 132 is chosen so as to advance the web 14 the length of one label 16 plus the length of the non-addressed area A plus B (FIG. 8) in the same amount of time that the gears 118, 120 normally advance the web 14 one label distance 16. In the illustrated embodiment, the non-printed area A plus B is the same length as the pre-printed labels 16 so that the ratio of the traction drive wheel 140 and the raised segment 138 of segmented wheel 132 is twice the ratio of the mesh between gears 118 and 120.

When the raised segment 138 of segmented wheel 132 is driven by the traction wheel 140, shaft 30 with ratchet 124 rotates counter-clockwise (FIG. 4) at a greater speed than when driven by gear 120. In addition, ratchet 124 attached to shaft 30 ratchets past pawl 126. The teeth on ratchet 124 are equally positioned about the circumference so that radii extending to the teeth form the included angle C (FIG. 4). Angle C multiplied by the radius of the sprocket wheel 28 equals the amount of non-printed area of web fed by sprocket wheel 28 during the driving of the raised segment 138.

The arc length of the raised segment 138 of segmented wheel 132 is chosen so that when the raised portion 138 engages the traction wheel 140 the web 14 is advanced one pre-printed label 16 plus the length of the non-addressed area, A plus B, plus a small increment D (FIG. 8) of the next pre-printed label 16, to insure that pawl 126 re-engages ratchet 124 at the proper tooth position.

Figure 10:
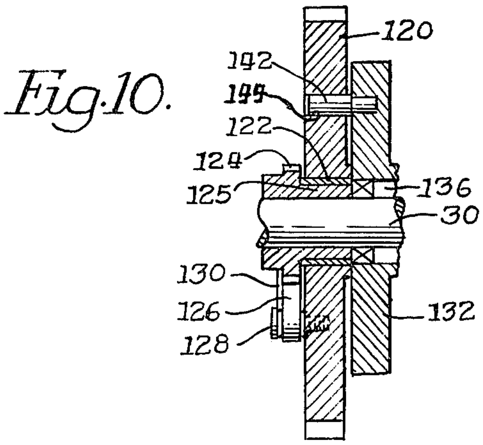
FIG. 10 is a cross sectional view with portions removed taken along line 10—10 of FIG. 5.

As seen in FIGS. 4 and 10 there is a pin 142 embedded in one face of the segmented wheel 132. The pin 142 rides in a slot 144 within the gear 120. When the traction wheel 140 drives the raised portion 138 of segmented wheel 132 faster than the engagement of gears 118 and 120, the pin 142 advances in slot 144 since the traction drive is faster than the gear drive. This can be seen in FIG. 4. The segmented wheel 132 has a slip clutch 146 which rides on the hub 134 of segmented wheel 132. The force of the slip clutch 146 can be adjusted by means of an adjusting screw 147. When the traction drive wheel 140 disengages from the raised segment 138, the slip clutch 146 in cooperation with overrunning clutch 136 holds segmented wheel 132 stationary until an end 148 of the slot 144 in gear 120 engages pin 142. The end 148 of slot 144 then drives segmented wheel 132 to complete its revolution until the raised segment 138 again re-engages the traction drive wheel 140. The distance or circumferential length of the recessed portion of segmented wheel 132 is equal to the total circumference of wheel 132 minus the length of the raised segment 138. This length is chosen to permit the sprocket wheel 28 to feed one less than the total of pre-printed labels 16 that exist between non-addressed areas 18 on the web 14. For example, if there are ten pre-addressed labels between each blank area, then the length of the recessed portion should be sufficient to allow the sprocket wheel 28 to feed nine pre-printed labels. The tenth label and non-printed area will be fed when the raised segment 138 is driven by the traction drive wheel 140. A slip clutch 150 is mounted to shaft 30 to prevent inertial overrun of the sprocket wheel 28. A tie bar 152 is mounted over and between shafts 30 and 98 to keep the shafts spaced and in proper alignment and to keep the gears and traction wheel properly spaced during operation.

By utilizing ratchet 124 and pawl 126, the invention prevents any cumulative errors. Each time the traction drive of traction drive wheel 140 on raised segment 138 is engaged, the pawl 126 disengages and subsequently re-engages the ratchet 124 after the proper incrementing of the shaft 30 to re-time the complete drive.

Figure 9:
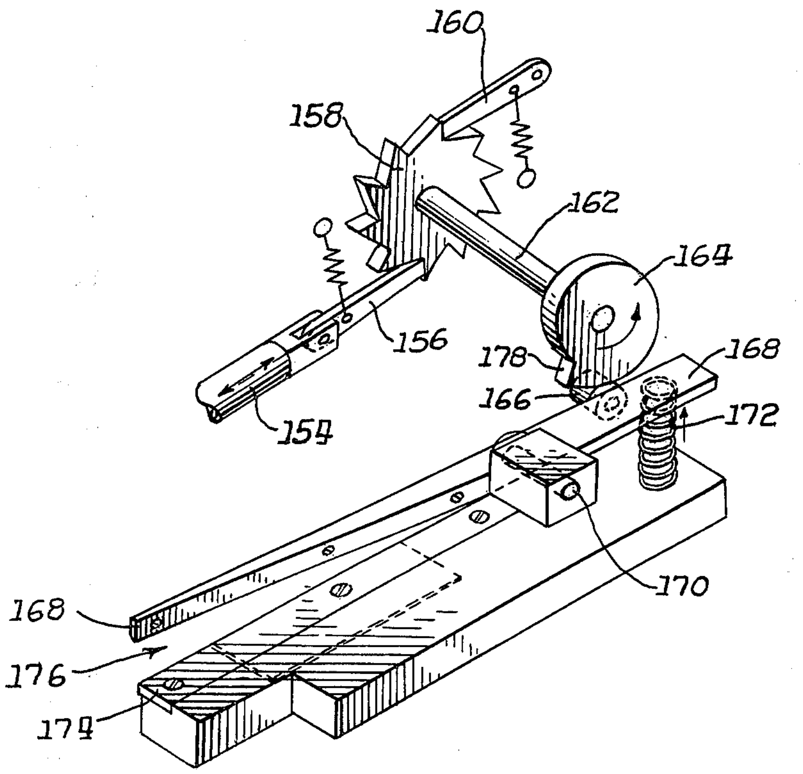
FIG. 9 is a partially schematic partially perspective view of the web cutting mechanism used to remove the non-printed areas from the printed labels at the appropriate time in the web cutting cycle.

In order to remove the extra amount of web 14 which is fed each time a non-addressed area is fed past the first cutting knife 60, a second properly timed cutting mechanism must be utilized. This can best be seen in FIG. 9. An eccentric and link arm illustrated schematically as 154, is connected to the gear drive system or to the sprocket shaft 30. It is only necessary that the eccentric and link arm 154 be connected to a timed, synchronized component within the device 10. It is preferable that it is coupled to the mechanism which operates the first cutting knife 60 such that for each actuation of the first cutting knife 60, the eccentric and link arm 154 operates a pawl 156. This advances a ratchet 158 one increment for each operation of the first cutting knife 60. A spring loaded latch 160 keeps the ratchet 158 from rotating in the reverse direction from the direction which the pawl 156 increments it forward. The number of steps or teeth on ratchet 158 are the same as the number of pre-printed labels that are between the non-addressed areas on the web 14. A shaft 162 is connected to the ratchet 158 and has a cam 164 at the opposite end. The cam 164 will rotate once for each time the group of pre-printed labels are fed and cut which are between the blank areas. A cam follower 166 is operated responsive to rotation of the cam 164. The cam follower 166 is connected to a second cutting knife 168 which rotates around a pivot 170. The cam 164 operates against a spring 172 which tends to keep the second cutting knife 168 in a closed position. As the cam 164 rotates, it eventually reaches the high point of the cam surface which causes the second cutting knife 168 to be raised away from a fixed blade 174 forming a sufficiently large throat 176 to allow the blank non-addressed area of the web 14 to pass through. The timing of the second cutting knife 168 is such that the blank area is moved into the throat 176 as the high point of the cam 164 opens the second cutting knife 168 to its highest position. Thereafter, a step 178 on the cam 164 increments past the follower 166 upon the next incrementation of the ratchet 158. This causes the second cutting knife 168 to be released suddenly from the high point of the cam 164 by the force of the spring 172 which causes the second cutting knife 168 to cut the non-addressed area from the web 14. Thus, the label 16 which was attached to the non-addressed portion is cut to the same size as all adjacent labels. The position of the non-addressed area before it is cut is illustrated by the portion of the web 14 shown in phantom extending past the second cutting knife in FIGS. 2 and 3.

This invention is not limited to using a single column of address labels as illustrated, but can be applied to multiple column address sheets with a minor modification of the sprocket wheel 28. The multiple column address labels can be cut into strips and the individual labels can be cut from the strip as illustrated in U.S. Pat. No. 4,124,435 with minor modifications to the feeding and cutting mechanism. The length of the non-addressed area of the web 14 does not have to be equal to the length of the pre-printed addresses 16 and can be longer or shorter. The only criteria is that these non-addressed areas occur at pre-determined regular intervals along the web 14.

It should be mentioned that the non-addressed areas do not have to blank, non-printed areas. They could be positioned on the web in locations which are used to convey information, i.e. control numbers or codes, to control the machine or sorting of the mail pieces automatically or manually. It is still required that the non-addressed areas occur at pre-determined regular intervals, and are to be removed from the address labels before they are affixed to the mail pieces.

It is also possible that with a slight adjustment of the tie bar 152, the inventive device could be used as a standard label applying machine. This results from moving the segmented wheel 132 slightly away from the traction drive wheel 140 so that the raised segment 138 will not engage and be driven by the wheel 140. Thus, the web will not be fed an additional amount each time the segmented wheel revolves one complete revolution.

Thus, there has been provided a label feeder that fully satisfies the objects, aims and advantages set forth above. It is evident that many alternatives, modifications, and variations will be apparent to those skilled in the art. Accordingly, it is intended to embrace all such variations as fall within the spirit and broad scope of the appended claims.

What is claimed is:

1. A method for preparing and feeding address labels on a web wherein the address labels are arranged in a column, with each address label equal in size to adjacent address labels, and non-addressed areas at equally spaced distances along the web, with the non-addressed areas separated by the address labels, the method comprising:

automatically feeding the web a first or second distance, the first distance equal to the desired height of a single label, and the second distance equal to the height of the non-addressed area plus the height of a single label;

feeding the web the first distance when only an address label is to be cut from the web and feeding the web the second distance when an address label and adjacent non-addressed area are to be cut from the web;

cutting the address label from the web after the web has been fed the first or second distance;

cutting the non-addressed area from the address label if the web was fed the second distance, so that all the address labels are substantially the same size when applied to the mail pieces;

removing the label after it is cut from the web;

applying the removed label to a mail piece at a label application location;

synchronously moving the mail piece through the label application location with the web advancing and cutting regardless of whether the web was fed the first or second distance.

2. The method of claim 1 wherein the web is fed the first distance when the immediately preceding area on the web is an address label, and feeding the web the second distance when the immediately preceding area on the web is a non-addressed area.

3. A device for feeding address labels on a web wherein the address labels are arranged in rows and columns, and non-addressed areas between the rows at equally spaced distances along the web, each address label equal in size to adjacent address labels, the device comprising:

first cutting means for cutting a row of address labels from the web;

feeder means to automatically vary the incremental advance of the web a first or second distance into the first cutting means, the first distance equal to the height of a label, and the second distance equal to the height of the non-addressed area plus the height of a label;

the feeder means incrementing the first distance when only a row of address labels is to be cut from the web and incrementing the second distance when a row of address labels and adjacent non-addressed areas are to be cut from the web;

second cutting means operated responsive to the feeder means incrementing the second distance for cutting the non-addressed areas from the row of address labels so that the address labels are all substantially the same height after being cut;

third cutting means for cutting the row of address labels into individual address labels;

means for removing the individually cut address labels;

means for applying the removed label to a mail piece at a label application location;

means for synchronously moving the mail piece through the label application location;

means for synchronizing the movement of the mail piece with the web advancing and cutting means regardless of whether the feeder means increments the first or second distance;

whereby the non-addressed areas between rows are cut and removed from the web while the synchronous movement between cutting and applying the labels to the mail pieces is maintained without interruption of the movement of the mail pieces.

4. The device of claim 3 wherein the second cutting means is positioned downstream in the direction of movement of the web of the first cutting means and is operated after the feeder means increments the web the second distance.

5. The device of claim 3 wherein the first cutting means comprises a stationary blade and a movable knife, means to synchronize the movable knife with the movement of the feeder means to cut the web each time the feeder means increments the web the first or second distance past the first cutting means.

6. The device of claim 3 wherein the first feeder means comprises a sprocket wheel and first power input drive means operatively connected to the sprocket wheel to incrementally rotate the sprocket wheel a distance corresponding to feeding the web the first distance.

7. The device of claim 6 wherein the feeder means further comprises a second power input drive means operatively connected to the sprocket wheel to incrementally move the sprocket wheel a distance corresponding to feeding the web the second distance.

8. The device of claim 7 wherein the first power input drive means comprises a web feeding shaft connected to drive the sprocket wheel, ratchet means attached to the web feeding shaft, pawl drive means operatively engaging the ratchet means to incrementally rotate the ratchet means and the web feeding shaft, and power source means to drive the pawl drive means.

9. The device of claim 8 wherein the second power input drive means comprises roller means connected to the web feeding shaft, a drive roller connected to the power source means, means to intermittently engage the drive roller with the roller means to cause rotation of the roller means, clutch means interposed between the roller means and the web feeding shaft to transmit power to the web feeding shaft, the speed with which the drive roller drives the roller means and in turn the web feeding shaft being greater than the speed which the pawl drive means drives the web feeding shaft, whereby the sprocket wheel feeds the web the first distance when driven by the pawl drive means and the second distance when driven by the drive roller and roller means.

10. The device of claim 9 wherein the roller means and the means to intermittently engage the drive roller are on one device and comprise a segmented roller with a raised portion on the circumference of the segmented roller with the drive roller engaging the raised portion each time the segmented roller revolves one complete revolution.

11. The device of claim 10 wherein the clutch means permits the segmented roller to drive the web feeding shaft when the raised portion of the segmented roller is engaged and driven by the drive roller.

12. The device of claim 11 and further comprising a pin extending from a side of the segmented roller, a slot on the first power input means which engages the pin and causes the segmented roller to rotate with the web feeding shaft when the raised portion of the segmented roller is not engaged with and driven by the drive roller.

13. The device of claim 12 wherein the length of the raised portion corresponds to feeding the web the second distance in the same amount of time as one incrementation of the pawl drive means.

14. The device of claim 13 wherein the speed which the segmented roller is driven by the drive roller causes the web feeding shaft to rotate at twice the speed which the pawl drive means drives the web feeding shaft.

15. A device for preparing and feeding address labels from a web wherein the address labels are arranged in a column with each address label equal in size to adjacent address labels and non-addressed areas at equally spaced distances along the web with the non-addressed areas separated by the address labels, the device comprising:

first cutting means for cutting the web into individual address labels;

feeder means to automatically vary the incremental advance of the web a first or second distance into the first cutting means, the first distance equal to the height of a single label, and the second distance equal to the height of the non-addressed area plus the height of a single label;

the feeder means incrementing the first distance when only an address label is to be cut from the web and incrementing the second distance when an address label and adjacent non-addressed area are to be cut from the web;

second cutting means operated responsive to the feeder means incrementing the second distance for cutting the non-addressed area from the address label so that the address labels are all substantially the same size after being cut;

means for removing the label after it is cut from the web;

means for applying the removed label to a mail piece at a label application location;

means for synchronously moving the mail piece through the label application location;

means for synchronizing the movement of the mail piece with the web advancing and cutting means regardless of whether the feeder means increments the first or second distance;

whereby the non-addressed areas are cut and removed from the web while the synchronous movement between cutting and applying the labels to the mail pieces is maintained without interruption of the movement of the mail pieces.

16. The device of claim 15 wherein the feeder means increments the web the first distance when the immediate proceeding area on the web fed into the first cutting means is an address label, and the feeder means increments the web the second distance when the immediate preceding area on the web fed into the first cutting means is a non-printed area.

17. The device of claim 16 wherein the first cutting means comprises a stationary blade and a movable knife, the movable knife synchronized with the movement of the feeder means and mail pieces to cut the web after each incremental movement of the web.

18. The device of claim 17 and further comprising transport means on the web which are engaged by complementary transport means on the feeder to accurately and positively control web movement into the first cutting means.

19. The device of claim 18 wherein the transport means on the web comprises holes and the complementary transport means on the feeder comprises a sprocket wheel with pins which engage the holes.

20. The device of claim 19 wherein the second cutting means is positioned downstream in the direction of movement of the web of the first cutting means and is operated after the feeder means increments the web the second distance.

21. The device of claim 20 wherein a feeder means comprises the sprocket wheel and first power input drive means operatively connected to the sprocket wheel to incrementally rotate the sprocket wheel a distance corresponding to feeding the web the first distance.

22. The device of claim 21 in the feeder means further comprises a second power input drive means operatively connected to the sprocket wheel to incrementally move the sprocket wheel a distance corresponding to feeding the web the second distance.

23. The device of claim 22 wherein the first power input drive means comprises a web feeding shaft connected to drive the sprocket wheel, ratchet means attached to the web feeding shaft, pawl drive means operatively engaging the ratchet means to incrementally rotate the ratchet means and the web feeding shaft, and power source means to drive the pawl drive means.

24. The device of claim 23 wherein the second power input drive means comprises roller means connected to the web feeding shaft, a drive roller connected to the power source means, means to intermittently engage the drive roller with the roller means to cause rotation of the roller means, clutch means interposed between the roller means and the web feeding shaft to transmit power to the web feeding shaft, the speed with which the drive roller drives the roller means and in turn the web feeding shaft being greater than the speed which the pawl drive means drives the web feeding shaft, whereby the sprocket wheel feeds the web the first distance when driven by the pawl drive means and the second distance when driven by the drive roller and roller means.

25. The device of claim 24 in the roller means and the means to intermittently engage the drive roller are on one device and comprise a segmented roller with a raised portion on the circumference of the segmented roller with the drive roller engaging the raised portion each time the segmented roller revolves one complete revolution.

26. The device of claim 25 wherein the clutch means permits the segmented roller to drive the web feeding shaft when the raised portion of the segmented roller is engaged and driven by the drive roller.

27. The device of claim 26 and further comprising a pin extending from a side of the segmented roller, a slot on the first power input means which engages the pin and causes the segmented roller to rotate with the web feeding shaft when the raised portion of the segmented roller is not engaged with and driven by the drive roller.

28. The device of claim 27 wherein the speed which the segmented roller is driven by the drive roller causes the web feeding shaft to rotate at twice the speed which the pawl drive means drives the web feeding shaft.

29. The device of claim 28 wherein the length of the raised portion corresponds to feeding the web the second distance in the same amount of time as one incrementation of the pawl drive means.

* * * * *